(12) United States Patent
Chang et al.

(10) Patent No.: US 9,066,024 B2
(45) Date of Patent: Jun. 23, 2015

(54) MULTI-CAMERA SYSTEM AND METHOD OF CALIBRATING THE MULTI-CAMERA SYSTEM

(76) Inventors: Christopher C. Chang, Pleasanton, CA (US); Joshua Minsung Chang, Pleasanton, CA (US)

( * ) Notice: Subject to any disclaimer, the term of this patent is extended or adjusted under 35 U.S.C. 154(b) by 420 days.

(21) Appl. No.: 13/492,750

(22) Filed: Jun. 8, 2012

(65) Prior Publication Data

US 2012/0314089 A1 Dec. 13, 2012

Related U.S. Application Data

(60) Provisional application No. 61/494,792, filed on Jun. 8, 2011.

(51) Int. Cl.
*H04N 5/247* (2006.01)
*H04N 5/262* (2006.01)
*H04N 17/00* (2006.01)

(52) U.S. Cl.
CPC ............. *H04N 5/247* (2013.01); *H04N 5/2627* (2013.01); *H04N 17/002* (2013.01)

(58) Field of Classification Search
CPC ...................................................... H04N 13/02
USPC .................................. 348/143, 157, 160, 386
See application file for complete search history.

(56) References Cited

U.S. PATENT DOCUMENTS

| 4,951,073 | A | * | 8/1990 | Slavitter | 396/322 |
|---|---|---|---|---|---|
| 2005/0151849 | A1 | * | 7/2005 | Fitzhugh et al. | 348/207.99 |
| 2006/0146142 | A1 | * | 7/2006 | Arisawa et al. | 348/211.11 |
| 2007/0039030 | A1 | * | 2/2007 | Romanowich et al. | 725/105 |
| 2007/0291506 | A1 | * | 12/2007 | Nearhoof et al. | 362/600 |
| 2009/0046152 | A1 | * | 2/2009 | Aman | 348/157 |
| 2010/0007715 | A1 | * | 1/2010 | Lai et al. | 348/37 |

* cited by examiner

*Primary Examiner* — Richard Torrente
*Assistant Examiner* — Marnie Matt
(74) *Attorney, Agent, or Firm* — Thomas H. Ham (57) ABSTRACT

A multi-camera system and method of calibrating the multi-camera system uses at least one timer to synchronize cameras of the multi-camera system with respect to time. The cameras are used to capture images of the at least one timer. The images are then analyzed to adjust an image-capture timing parameter of at least one of the cameras to time synchronize the cameras.

17 Claims, 7 Drawing Sheets

MULTI-CAMERA SYSTEM AND METHOD OF CALIBRATING THE MULTI-CAMERA SYSTEM

CROSS REFERENCE TO RELATED APPLICATION

This application is entitled to the benefit of U.S. Provisional Patent Application Ser. No. 61/494,792, filed on Jun. 8, 2011, which is incorporated herein by reference.

BACKGROUND OF THE INVENTION

Multiple cameras can be used to digitally capture a subject, which may be moving, from different points of view. As an example, the subject may be a golfer executing a swing, and the cameras may be used to capture the golfer in action from different points of view around the golfer. The captured images of the subject can then be used to generate video or interactive software program, such as SWF, HTML, etc., to present the captured subject in creative ways to users. For example, captured images of a golfer in action may be used to generate an interactive software program that allows a user to view the golfer in mid-swing and then to rotate the golfer in mid-swing that the user can view the golfer in mid-swing from various angles.

The use of multiple cameras may result in images of a subject with variations with respect to various image capturing parameters, such as the captured size of the subject, the rotational position of the captured subject and the exact moment in time when the subject was captured. These image capturing parameters can be manually adjusted for each camera so that images of a subject are captured with minimal variations. However, manually adjusting the cameras to minimize the variations can be tedious and imprecise.

Thus, there is a need for a calibration method for a multi-camera system that can reduce or eliminate the above concern.

SUMMARY OF THE INVENTION

A multi-camera system and method of calibrating the multi-camera system uses at least one timer to synchronize cameras of the multi-camera system with respect to time. The cameras are used to capture images of the at least one timer. The images are then analyzed to adjust an image-capture timing parameter of at least one of the cameras to time synchronize the cameras.

A method of calibrating a multi-camera system in accordance with an embodiment of the invention comprises placing at least one timer at a target location to which cameras of the multi-camera system are pointed, the at least one timer having a timing surface that is configured to visually indicate a passage of time, each of the cameras being positioned such that at least one timing surface of the at least one timer is in the field of view of that camera, analyzing the image of the at least one timer captured by each of the cameras to determine the moment in time when the image was captured as indicated on the at least one timing surface in the image, and adjusting an image-capture timing parameter of at least one of the cameras using results of the analyzing to synchronize the cameras with respect to time.

A method of calibrating a multi-camera system in accordance with another embodiment of the invention comprises placing a reference object at a target location to which cameras of the multi-camera system are pointed, transmitting trigger signals to the cameras so that each of the cameras captures an image of the reference object, analyzing the image of the reference object captured by each of the cameras to calculate a value with respect to at least one of size, center and rotational orientation of the reference object in the image of the reference object, and comparing the value with a standard desired value to determine a delta value that can be used to adjust a subsequent image of a subject captured by a camera associated with the delta value.

A multi-camera system in accordance with an embodiment of the invention comprises at least one timer, a plurality of cameras and a master trigger control device. The at least one timer has a timing surface that is configured to visually indicate a passage of time. Each of the cameras is positioned such that the at least one timing surface of the at least timer is in the field of view of that camera. The master trigger control device is operably connected to the cameras to trigger the cameras to capture images within their field of view. The images of the at least one timer captured by the cameras provide timing information regarding when the images were captured by the cameras, which is used to time synchronize the cameras.

Other aspects and advantages of the present invention will become apparent from the following detailed description, taken in conjunction with the accompanying drawings, illustrated by way of example of the principles of the invention.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
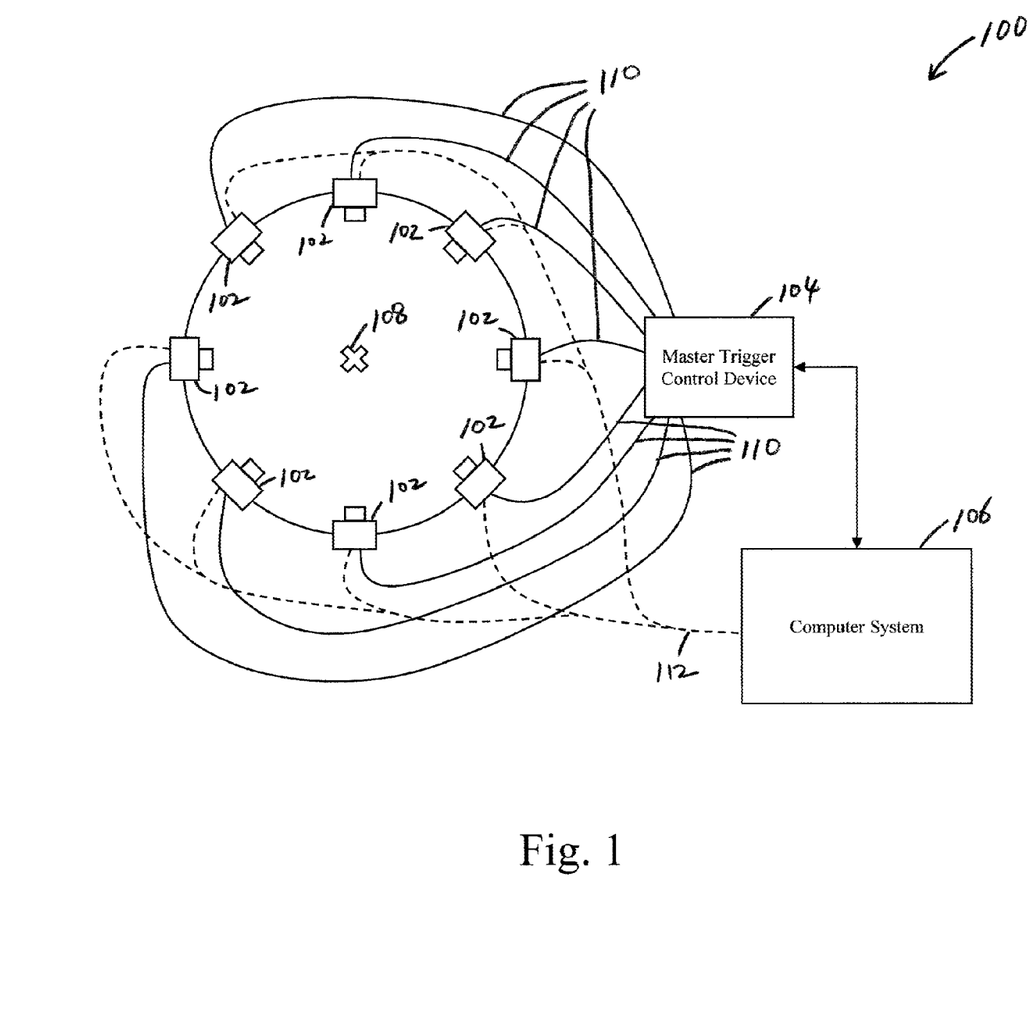
FIG. 1 is a block diagram of a multi-camera system in accordance with an embodiment of the invention.

With reference to FIG. 1, a multi-camera system 100 in accordance with an embodiment of the invention is described. As shown in FIG. 1, the multi-camera system includes a number of cameras 102, a master trigger control device 104, and a computer system 106. The cameras are positioned around a target location 108, where a subject can be situated so that the cameras can capture images of the subject. In an embodiment, the cameras are positioned around the target location in a circle so that each camera is equidistant from the target location. The cameras may also be positioned in the circle so that each camera is equidistant from neighboring cameras. In addition, the cameras are positioned on a plane substantially parallel to the floor. As used herein, the term "substantially" means plus or minus five (5) degrees. Furthermore, each camera is orientated to point at the target location so that a subject at the target location would be in the field of view of that camera. In the illustrated embodiment, the multi-camera system includes eight cameras that surround the target location. However, in other embodiments, the multi-camera system can have any number of cameras surrounding the target location. The number of cameras included in the multi-camera system determines the number of captured images available for a single composite visual representation of the subject at a moment in time. These captured images of the subject at a particular moment in time can be presented to a user in any number of formats. In one format, the captured images of the subject at a particular moment can be used to create a virtual three-dimensional graphic representation of the subject at that moment in time, which can be viewed by the user. In another format, the captured images of the subject at a particular moment can be used to provide the user with multiple views of the subject at that moment in time, which can be viewed one-by-one by the user or can be viewed collectively in one or more groups by the user.

The cameras 102 can be any type of cameras that can electronically capture images of scenes within their field of view. In the illustrated embodiment, the cameras may be digital still cameras, such as digital single-lens reflex (SLR) cameras, e.g., Canon Rebel and Nikon D3000 digital SLR cameras. In another embodiment, the cameras may be digital video cameras, which may be able to take still images. The cameras include wired or wireless trigger interfaces so that each of the cameras can be triggered to capture an image when a trigger signal is transmitted to that camera. In FIG. 1, the cameras include wired trigger interfaces, and thus, the cameras are connected to the master trigger control device by wires 110.

The master trigger control device 104 is configured to simultaneously transmit trigger signals to the cameras 102 so that the cameras can synchronously capture images of a subject at the target location, i.e., capture images of the subject at the same moment in time. The master trigger control device is controlled by the computer system 106, and thus, transmits the trigger signals to the cameras in response to instructions from the computer system, which may involve one or more control signals being sent to the master trigger control device from the computer system.

Figure 2A:
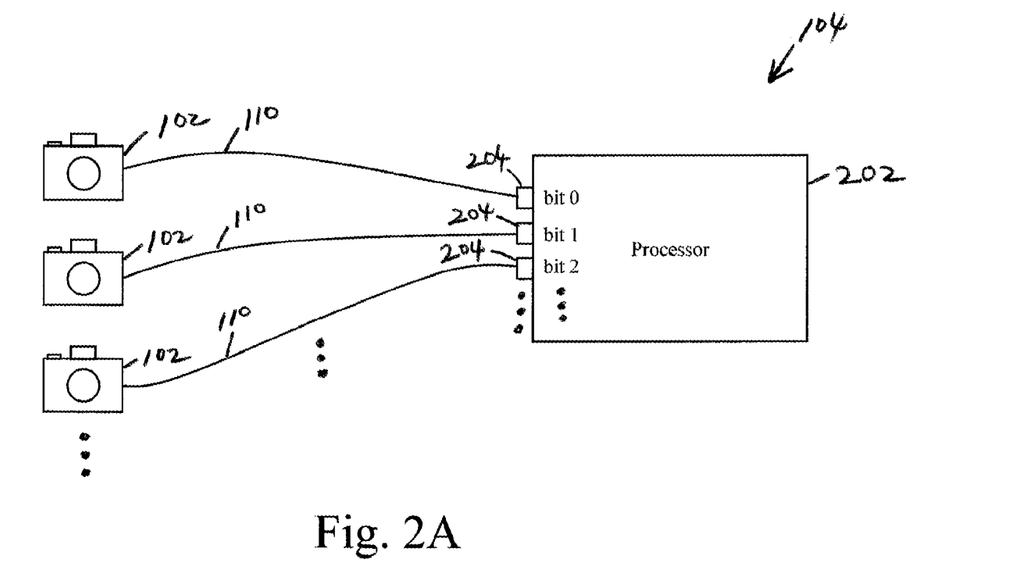
FIGS. 2A and 2B show a master trigger control device of the multi-camera system in accordance with different embodiments of the invention.

In one implementation, as illustrated in FIG. 2A, the master trigger control device 104 is configured to directly output trigger signals to each of the cameras 102. In this implementation, the master trigger control device is a processor 202 with a number of ports 204, which are connected to the cameras via the wires 110. The processor can be any type of a processor. The processor may be a general-purpose digital processor, such as a microprocessor or microcontroller. In other embodiments, the processor may be a special-purpose processor, such as a digital signal processor. In still other embodiments, the processor may be another type of controller or a field programmable gate array (FPGA). In operation, the processor outputs trigger signals as bits of data to the ports, which are then transmitted to the individual cameras through the wires. As illustrated in FIG. 2A, different bits, e.g., bit 0, bit 1, bit 2, etc., are outputted to different ports to trigger the cameras connected to the respective ports. Thus, in this implementation, the master trigger control device can selectively trigger one or more of the cameras for a given moment of time using bits of data.

Figure 2B:
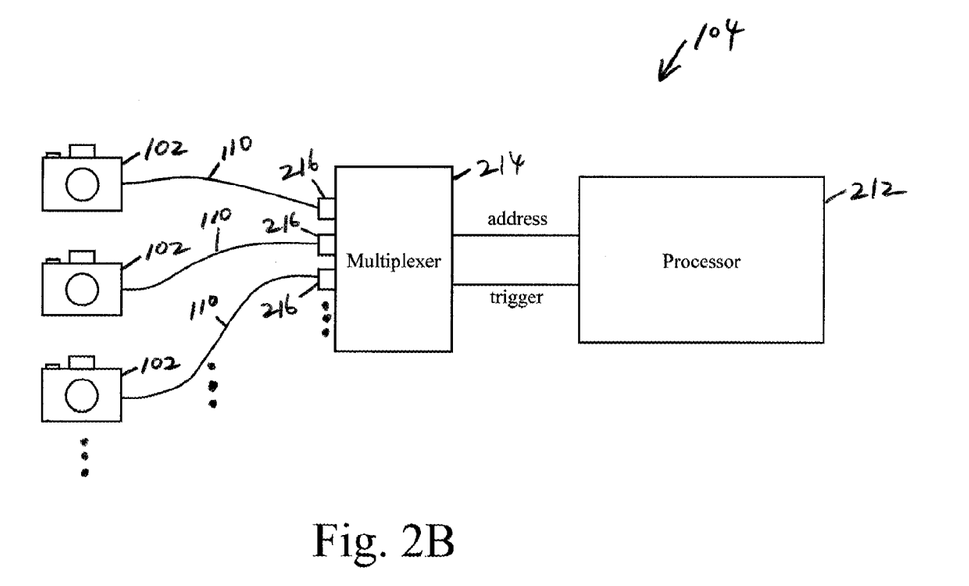

In another implementation, as illustrated in FIG. 2B, the master trigger control device 104 is configured to output trigger signals to the cameras 102 using multiplexing. In this implementation, the master trigger control device includes a processor 212 connected to a multiplexer 214, which includes a number of ports 216 that are connected to the cameras via the wires 110. The processor 212 can be any type of a processor. The processor 212 may be a general-purpose digital processor, such as a microprocessor or microcontroller. In other embodiments, the processor 212 may be a special-purpose processor, such as a digital signal processor. In still other embodiments, the processor 212 may be another type of controller or a FPGA. In operation, the processor 212 sends address data and a trigger signal to the multiplexer. The address data indicates which ports should be used to transmit the trigger signal to the cameras so that one or more of the cameras can be selectively triggered to capture images.

Turning back to FIG. 1, the computer system 106 is connected to the master trigger control device 104 to control the transmission of the trigger signals to the cameras 102 from the master trigger control device. The computer system is also connected to the cameras to receive the digital images captured by the cameras. In the illustrated embodiment, the computer system is connected to the cameras using wires 112. However, in other embodiments, the computer system may be wirelessly connected to the cameras, using, for example, WiFi SD (or SDHC) cards in the cameras. The computer system can be any type of computer system that includes one or more processors and memory. In an embodiment, the computer system may be a personal computer. The computer system may include one or more software programs to control the triggering of the cameras via the master trigger control device 104 and to receive and process the captured images from the cameras. These software programs may also be used to set image-capturing parameters of the cameras. Although the master trigger control device and the computer system are illustrated as being separate components, in some embodiments, these components of the multi-camera system 100 may be integrated into a signal device.

The cameras 102 of the multi-camera system 100 are used to simultaneously capture pictures or images of a subject at the target location 108. The subject may be moving when the images of the subject are captured by the cameras. The use of multiple cameras can result in undesirable consequences in the captured images due to mechanical setup variations and electrical timing differences among the cameras.

Figure 3:
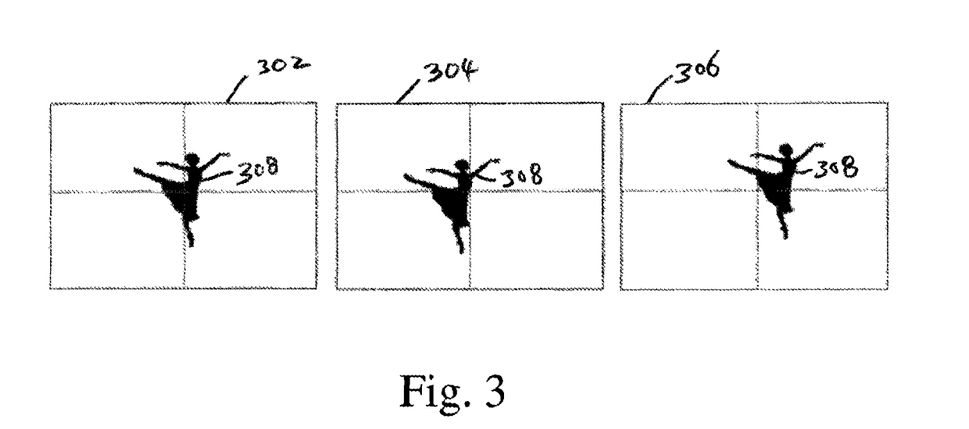
FIG. 3 illustrates variations in the location of the center of a subject in images captured by multiple cameras.

As an example, depending on the pan and tilt angles of each camera 102, the center of the subject can vary from camera to camera, as illustrated in FIG. 3. In FIG. 3, three images 302, 304 and 306 of a subject 308 that are captured by three of the cameras 102 are shown. The subject in the image 302 is centered. However, the subject in the image 304 is shifted to the left and the subject in the image 306 is shifted to the right. Although not illustrated, an image of the subject 308 captured by one or more of the cameras may also be titled or rotated in a clockwise or counterclockwise direction. Thus, images of a subject captured by the cameras may vary with respect to the position and/or orientation of the subject in the images.

Figure 4:
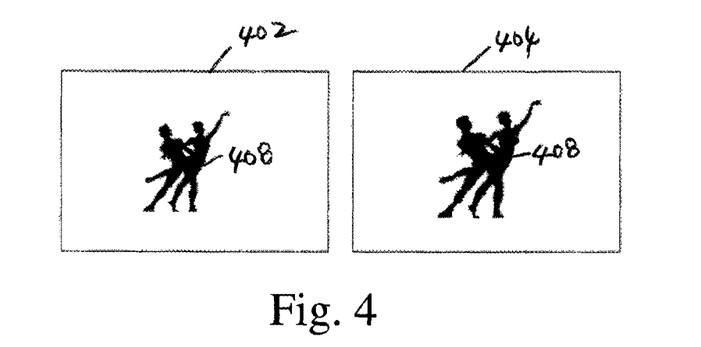
FIG. 4 illustrates variations in the size of a subject in images captured by multiple cameras.

As another example, depending on the distance of the subject to each of the cameras 102 and/or the zoom lens setting of each of the cameras, the size of the subject in the captured images can vary from camera to camera, as illustrated in FIG. 4. In FIG. 4, two images 402 and 404 of a subject 408 that are captured by two of the cameras are shown. The subject in the image 402 is smaller than the subject in the image 404.

Figure 5:
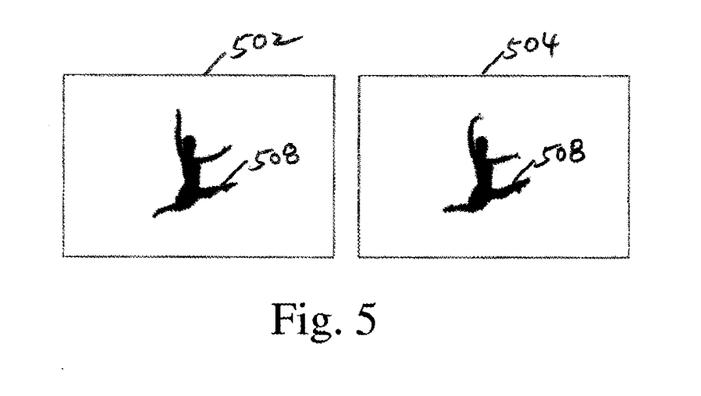
FIG. 5 illustrates variations in the exact moment of time when images of a subject are captured by multiple cameras.

As another example, due to mechanical and/or electrical variations of the cameras 102, the exact moment of time when the images of the subject are captured by the cameras can vary from camera to camera, as illustrated in FIG. 5. In FIG. 5, two images 502 and 504 of a subject 508 that are captured by two of the cameras are shown. The subject in the image 502 is captured at an earlier time than the subject in the image 504.

In an embodiment, the variations in position, orientation and size of a subject in images captured by the cameras 102 are resolved using a calibration method involving a reference object and image processing. The reference object used for this method is a spherical object, such a spherical ball. However, other reference objects may be used in some application, such as a cylindrical object, as long as the reference object appears the same when viewed from the different positions of the cameras. The reference object may include markings to indicate rotational orientation of the reference object. As an example, for a spherical object, the marking may include one or more vertical lines and/or one or more horizontal lines (similar to longitudinal and latitudinal lines of Earth).

Figure 6:
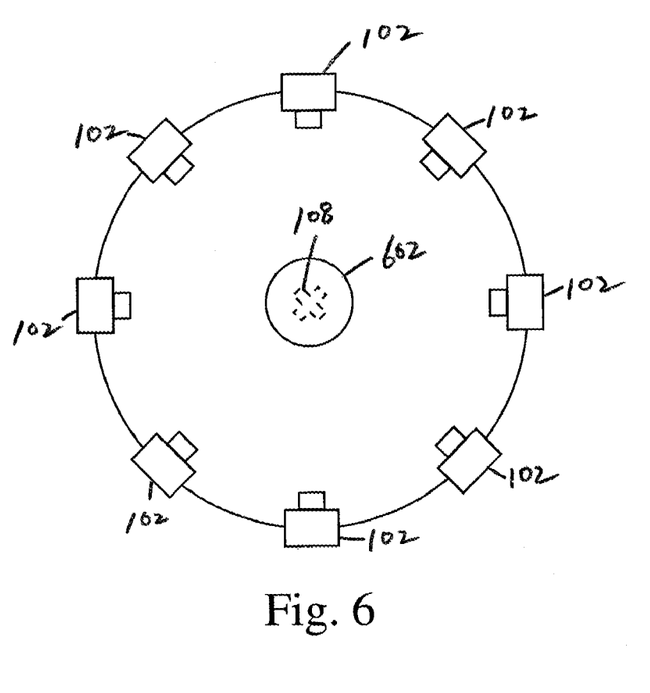
FIG. 6 illustrates a calibration method to compensate for variations in position, orientation and size of a subject in images captured by cameras of the multi-camera system using a reference object in accordance with an embodiment of the invention.

As illustrated in FIG. 6, this calibration method begins when a reference object 602, which can be viewed as being part of the multi-camera system 100, is placed at the target location 108, which would be where a subject is positioned when the cameras 102 are triggered to capture images of the subject. In FIG. 6, only the cameras of the multi-camera system are shown. Next, images of the reference object are taken from each of the cameras. Taking the images of the reference object may involve using a software program running on the computer system 106 to instruct the master trigger control device 104 to issue trigger signals to the cameras. The images of the reference object are then transmitted to the computer system, where values with respect to the size, the center and the rotational orientation of the reference object in the captured images are calculated. These values are then compared with the standard desired values to determine delta values with respect to the size, the center and the rotational orientation of the reference object. The process for determining the delta values may be fully automated using one or more software programs running on the computer system or may involve at least some manual input. These delta values are used to adjust the size, the center and the rotational orientation of a subject when the images of the subject are captured using each of the cameras using conventional image processing techniques.

In an embodiment, the variations in timing of the cameras in capturing images of a subject are resolved using a calibration method with respect to time synchronization involving at least one timer that is configured to indicate the passage of time. The timer can be any timer with a visual indicator that shows the passage of time. For example, the timer can be a clock or a stopwatch. In an embodiment, the timer can be a timer with multiple lighting devices that either turns off or turns on to indicate the passage of time.

Figure 7:
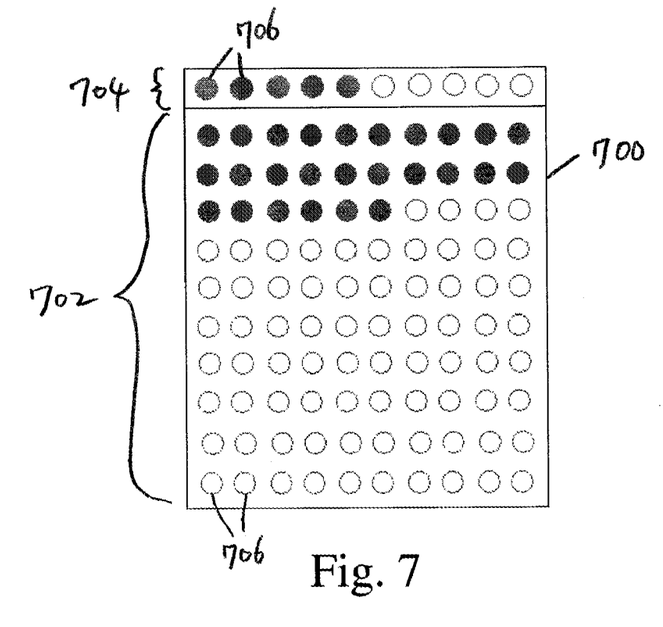
FIG. 7 is a block diagram of a timer with multiple lighting devices used in the multi-camera system to time synchronize the cameras in accordance with an embodiment of the invention.

FIG. 7 shows an embodiment of a timer 700 that can be used in the multi-camera system 100 to synchronize the trigger timing of the cameras 102. As shown in FIG. 7, the timer includes a first group 702 of lighting devices 706 and a second group 704 of lighting devices. The lighting devices included in the timer can be any type of lighting devices that emit light when activated or turned on. In one implementation, the lighting devices of the timer are light-emitting diodes (LEDs). When activated, each of the lighting devices of the first group 702 is configured to be turned on at a predefined time interval until all the lighting devices of the first group are turned on. As an example, the predefined time interval for the lighting devices of the first group may be 1 millisecond. In this example, a lighting device in the first group is turned on every 1 millisecond. Similarly, each of the lighting devices of the second group 704 is configured to be turned on at another predefined time interval until all the lighting devices of the second group are turned on. As an example, the predefined time interval for the lighting devices of the second group may be one hundred (100) milliseconds. In this example, a lighting device of the second group is turned on every one hundred (100) millisecond. Using the above examples, the timer may be designed to include one hundred (100) lighting devices in the first group, which may be arranged in a 1×10 configuration, and ten (10) lighting devices in the second group, which may be arranged in a 10×1 configuration, as illustrated in FIG. 7. In this arrangement, the timer can be used to synchronize up to 1 millisecond interval. In order to easily differentiate between the lighting devices of the first group 702 and the light devices of the second group 702 in the timer 700, the lighting devices of the first group may be configured to emit different color light than the lighting devices of the second group. As an example, the lighting devices of the first group may be configured to emit red color light when turned on and the lighting devices of the second group may be configured to emit green color light when turned on. The surface of the timer 700 shown in FIG. 7 can be viewed as a timing surface that is configured to visually indicate a passage of time using the lighting devices.

In FIG. 7, thirty-six (36) lighting devices of the first group 702 are turned on (indicated by the solid circles) and five (5) lighting devices of the second group 704 are turned on (indicated by the solid circles). Thus, one can quickly determine that 536 milliseconds have passed since the timer 700 was started, if the timer began with all the lighting devices turned off. If the timer began with all the lighting devices turned on and the lighting devices are turned off as time passes, then the timer indicates that 564 milliseconds have passed since the timer was started.

Figure 8:
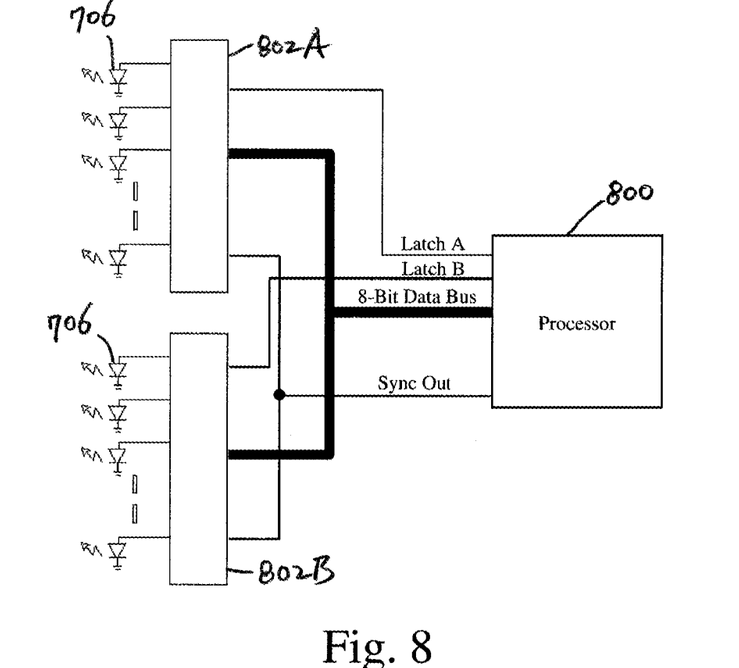
FIG. 8 is a diagram of components used to control the lighting devices of the timer in accordance with an embodiment of the invention.

In an implementation, the lighting devices 706 of the timer 700 may be controlled using a processor 800, and one or more latch buffers 802A and 802B, as illustrated in FIG. 8. In FIG. 8, an example of a 16-bit LED display control is shown. The processor 800 may be a general-purpose digital processor, such as a microprocessor or microcontroller. In other embodiments, the processor 800 may be a special-purpose processor, such as a digital signal processor. In still other embodiments, the processor 800 may be another type of controller or a FPGA. In this example, the latch buffers 802A and 802B are 8-bit latch buffers so that 8-bit data is selectively loaded into the buffers by signals on a latch A line or a latch B line and then the output is done simultaneously using a signal on a sync out line. If 1 millisecond interval is used for the timer, at every millisecond, each LED 706 is turned on (i.e., a different LED is turned on at every millisecond). At the end of 16 milliseconds, all the LEDs are on and this cycle starts over again from all the LEDs being off. For example, to turn nine (9) LEDs on, the following steps are taken:

(1) load 0xFF to the 8-bit data bus, (2) trigger a signal on the latch A line to load 0xFF to the first 8-bit latch buffer 802A, (3) load 0x01 to the 8-bit data bus, (4) trigger a signal on the latch B line to load 0x01 to the second 8-bit latch buffer 802B, and (5) trigger a signal on the sync output line to transfer the buffered values to the actual outputs to have the nine LEDs on.

The example illustrated in FIG. 8 is for sixteen (16) LEDs at one (1) millisecond interval for a sixteen (16) millisecond timer. For a longer timer, more LEDs and buffer latches can be used to increase the LED number and the total time count of the timer.

Figure 9:
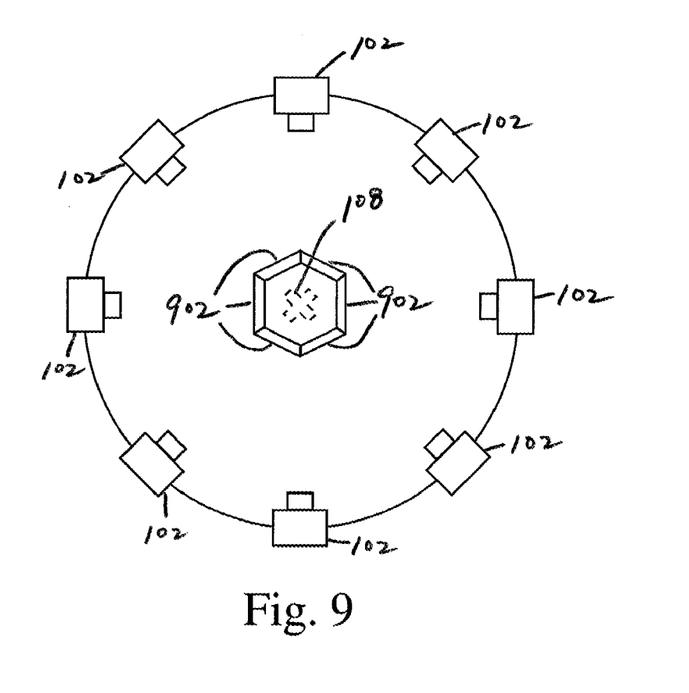
FIG. 9 illustrates a calibration method to compensate for variations in image capturing times of the cameras of the multi-camera system using timers in accordance with an embodiment of the invention.

In an embodiment, multiple timers 902, which may be identical to the timer 700, are placed at the target location 108, as illustrated in FIG. 9. The timers 902 are positioned at the target location so that each of the cameras 102 has at least one of the timers in its field of view, which means that at least one of the timers will be captured in an image when that camera is triggered to take a picture.

In operation, the timers 902 are started, which may be initiated by the computer system 106 via a wired or wireless communication. As the timers are running, the cameras 102 are triggered simultaneously by the master trigger control device 104 in response to a control signal from the computer system 106. As a result, an image of at least one of the timers is captured by each of the cameras. The images of the timers captured by the cameras are then analyzed to determine any camera trigger timing differences, i.e., differences in the moments of time when the cameras captured the images in response to the trigger signals transmitted to the cameras from the master trigger control device. The camera trigger timing information can then be used to update the camera triggering control timing or the image-capture timing parameter of cameras so that all the cameras are triggered synchronously, i.e., all the cameras captures images at the same time, e.g., within 1 millisecond. In an embodiment, the camera triggering control timing may be updated manually for any camera that needs to be adjusted. In another embodiment, a software program running on the computer system 106 may be used to update the camera triggering control for any camera that needs to be adjusted.

As described above with respect to FIG. 1, in the illustrated embodiment, the cameras 102 of the multi-camera system 100 are positioned on a single plane, surrounding the target location 108, so that different views of a subject at the target location can be simultaneously captured using the cameras. However, in other embodiments, additional cameras can be used to capture other views of a subject from different positions. In some embodiments, the multi-camera system may further include cameras on another plane that is parallel to the plane on which the cameras 102 shown in FIG. 1 are positioned.

Figure 10:
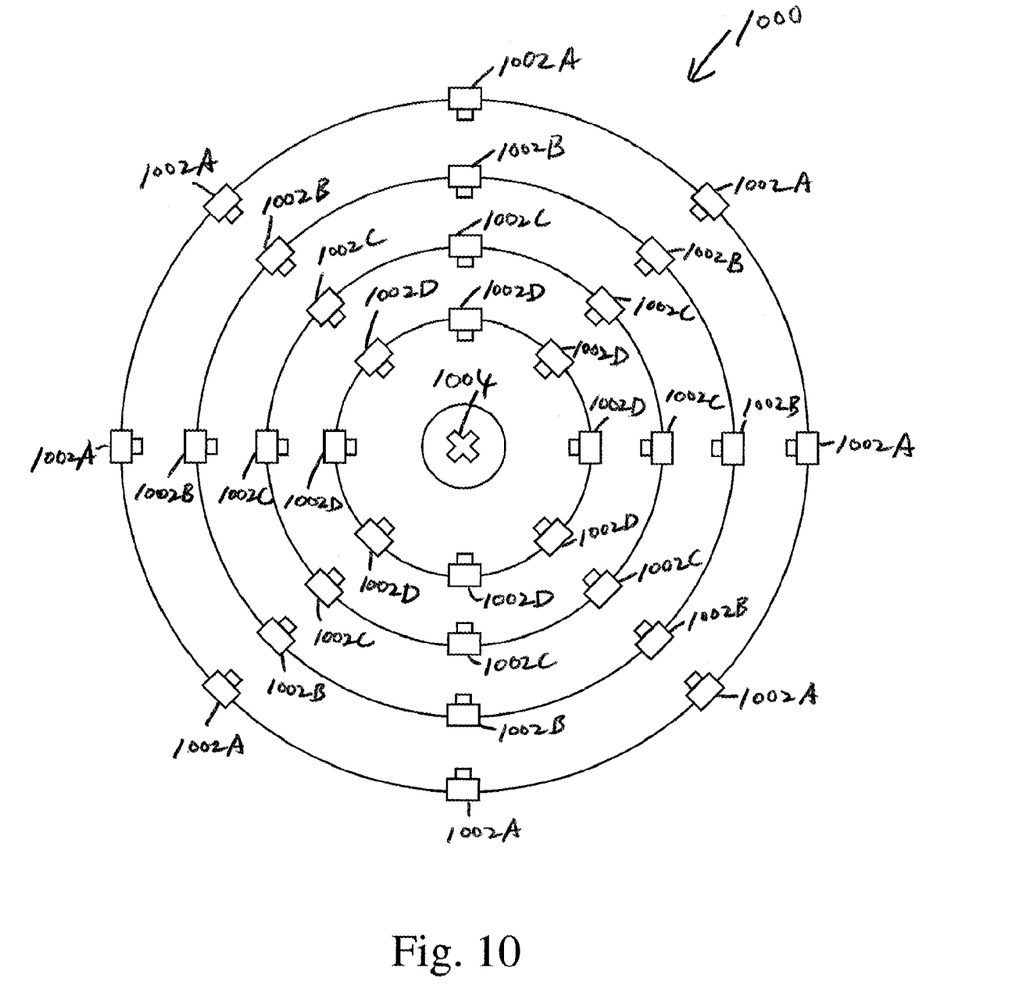
FIG. 10 is a block diagram of a multi-camera system in accordance with another embodiment of the invention

Turning now to FIG. 10, an arrangement of cameras 1002A, 1002B, 1002C and 1002D of a multi-camera system 1000 in accordance with another embodiment of the invention is shown. In this embodiment, the cameras are situated on the surface of a hemisphere with a target location 1004 for a subject situated at the center of the hemisphere. FIG. 10 is a top view of the cameras 1002A, 1002B, 1002C and 1002D that are positioned on the surface of the hemisphere, which can be viewed as being situated on a floor. In addition to being on the surface of the hemisphere, the cameras 1002A are also positioned on a first plane that is substantially parallel to the floor. Similarly, the cameras 1002B are also positioned on a second plane that is substantially parallel to the floor, but at a higher distance from the floor than the first plane. Likewise, the cameras 1002C are also positioned on a third plane that is substantially parallel to the floor, but at a higher distance from the floor than the second plane. Lastly, the cameras 1002D are also positioned on a fourth plane that is substantially parallel to the floor, but at a higher distance from the floor than the third plane. In the illustrated embodiment, there is same number of cameras on each of the planes, i.e., eight cameras. However, in other embodiments, there can be any number of cameras on each of the planes. In addition, four cameras, one from each of the planes, are positioned along the same longitudinal line of the hemisphere so that eight cameras are positioned along a plane that is substantially perpendicular to the floor.

Although the cameras 1002A, 1002B, 1002C and 1002D of the multi-camera system 1000 are positioned on different planes above the floor, these cameras all point toward the target location 1004 so that each of the cameras can capture an image of a subject at the target location. The multi-camera system 1000 also includes a master trigger control device and a computer system, which are similar to the corresponding components of the multi-camera system 100 shown in FIG. 1.

Figure 11:
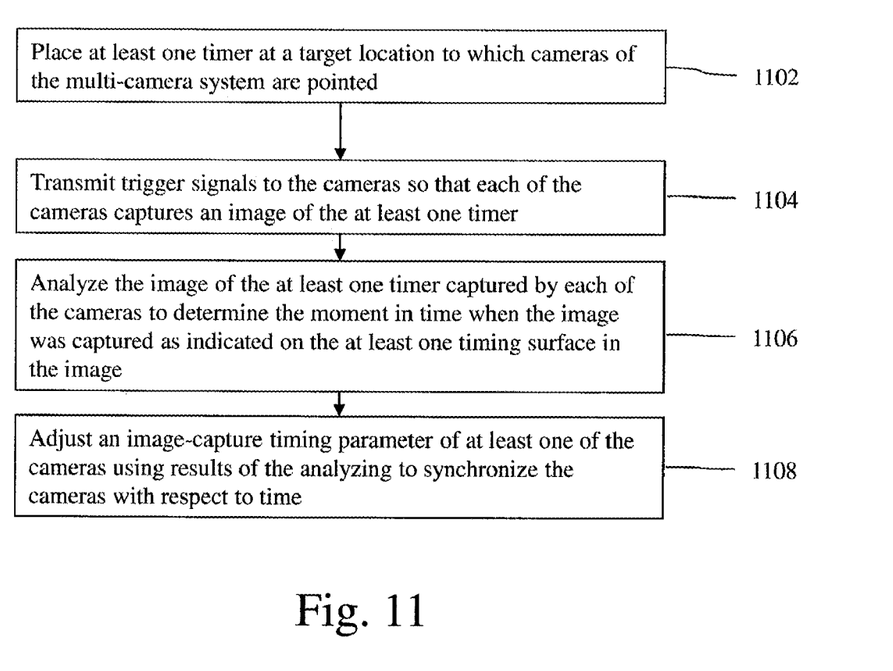
FIG. 11 is a process flow diagram of a method of calibrating a multi-camera system in accordance with an embodiment of the invention.

A method of calibrating a multi-camera system in accordance with an embodiment of the invention is described with reference to the process flow diagram shown in FIG. 11. At block 1102, at least one timer is placed at a target location to which cameras of the multi-camera system are pointed. The at least one timer has a timing surface that is configured to visually indicate a passage of time. Each of the cameras is positioned such that at least one timing surface of the at least one timer is in the field of view of that camera. At block 1104, trigger signals are transmitted to the cameras so that each of the cameras captures an image of the at least one timer. At block 1106, the image of the at least one timer captured by each of the cameras is analyzed to determine the moment in time when the image was captured as indicated on the at least one timing surface in the image. At block 1108, an image-capture timing parameter of at least one of the cameras is adjusted using results of the analyzing to synchronize the cameras with respect to time.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of calibrating a multi-camera system comprising:
   placing at least one timer at a target location to which cameras of the multi-camera system are pointed, the at least one timer having a timing surface that is configured to visually indicate a passage of time, each of the cameras being positioned such that at least one timing surface of the at least one timer is in the field of view of that camera;
   transmitting trigger signals to the cameras so that each of the cameras captures an image of the at least one timer;
   analyzing the image of the at least one timer captured by each of the cameras to determine the moment in time when the image was captured as indicated on the at least one timing surface in the image;
   adjusting an image-capture timing parameter of at least one of the cameras using results of the analyzing to synchronize the cameras with respect to time;
   placing a reference object at the target location;
   transmitting the trigger signals to the cameras so that each of the cameras captures an image of the reference object;
   analyzing the image of the reference object captured by each of the cameras to calculate values for size, center and rotational orientation of the reference object in the image of the reference object captured by each of the cameras;
   comparing the values with standard desired values to determine delta values that can be used to adjust a subsequent image of a subject captured by a camera associated with the delta values.

2. The method of claim 1, wherein the placing the at least one timer at the target location includes placing the at least one timer at the target location that is situated at the center of a circle on which the cameras are positioned.

3. The method of claim 1, wherein analyzing the image of the at least one timer includes determining lighting devices of the at least one timer that are turned on in the images.

4. The method of claim 3, wherein each of the lighting devices of the at least one timer represents a predefined time interval.

5. The method of claim 4, wherein some of the lighting devices of the at least one timer represent longer time intervals than other lighting devices of the at least one timer.

6. The method of claim 3, wherein the lighting devices of the at least one timer are light emitting diodes.

7. The method of claim 1, wherein the placing the reference object includes placing a spherical object at the target location.

8. The method of claim 1, further comprising transmitting the images of the at least one timer to a computer system from the cameras so that the images of the at least one timer can be analyzed.

9. A multi-camera system comprising:
   at least one timer having a timing surface that is configured to visually indicate a passage of time;
   a plurality of cameras, each of the cameras being positioned such that the at least one timing surface of the at least one timer is in the field of view of that camera;
   a master trigger control device operably connected to the cameras to trigger the cameras to capture images within their field of view,
   wherein the images of the at least one timer captured by the cameras provide timing information regarding when the images were captured by the cameras, the time information being used to time synchronize the cameras; and
   a reference object positioned so that images of the reference object can be captured by the cameras, the images of the reference object being used to calculate values for size, center and rotational orientation of the reference object in the images of the reference object captured by the cameras, wherein the values are compared with standard desired values to determine delta values that can be used to adjust a subsequent image of a subject captured by a camera associated with the delta values.

10. The system of claim 9, wherein the at least one timer is placed at a target location, the target location being situated at the center of a circle on which the cameras are positioned.

11. The system of claim 9, wherein the at least one timer includes lighting devices that turn on to indicate the passage of time.

12. The system of claim 11, wherein the at least one timer is configured such that each of the lighting devices of the at least one timer represents a predefined time interval.

13. The system of claim 12, wherein the at least one timer is configured such that some of the lighting devices of the at least one timer represent longer time intervals than other lighting devices of the at least one timer.

14. The system of claim 11, wherein the lighting devices of the at least one timer are light emitting diodes.

15. The system of claim 9, wherein the reference object is a spherical object.

16. The system of claim 9, further comprising a computer system operably coupled to the master trigger control device, the computer system being configured to provide a control signal to the master trigger control device to transmit the trigger signals to the cameras from the master trigger control device.

17. A method of calibrating a multi-camera system comprising:
- placing a reference object at a target location to which cameras of the multi-camera system are pointed;
- transmitting trigger signals to the cameras so that each of the cameras captures an image of the reference object;
- analyzing the image of the reference object captured by each of the cameras to calculate values for size, center and rotational orientation of the reference object in the image of the reference object; and
- comparing the values with a standard desired value to determine a delta value that can be used to adjust a subsequent image of a subject captured by a camera associated with the delta value.

* * * * *